United States Patent
Andreas-Schott

(10) Patent No.: US 11,038,190 B2
(45) Date of Patent: Jun. 15, 2021

(54) MEMBRANE ELECTRODE ASSEMBLY, FUEL CELL COMPRISING ASSEMBLY OF THIS TYPE AND MOTOR VEHICLE COMPRISING SAID FUEL CELL

(71) Applicant: Volkswagen Aktiengesellschaft, Wolfsburg (DE)

(72) Inventor: Benno Andreas-Schott, Triangel (DE)

(73) Assignee: Volkswagen Aktiengesellschaft, Wolfsburg (DE)

(*) Notice: Subject to any disclaimer, the term of this patent is extended or adjusted under 35 U.S.C. 154(b) by 574 days.

(21) Appl. No.: 14/696,879

(22) Filed: Apr. 27, 2015

(65) Prior Publication Data

US 2015/0228988 A1    Aug. 13, 2015

Related U.S. Application Data

(63) Continuation of application No. PCT/EP2013/071862, filed on Oct. 18, 2013.

(30) Foreign Application Priority Data

Oct. 25, 2012 (DE) ..................... 10 2012 020 975.4

(51) Int. Cl.
*H01M 8/242* (2016.01)
*H01M 8/0273* (2016.01)
(Continued)

(52) U.S. Cl.
CPC ......... *H01M 8/242* (2013.01); *H01M 8/0202* (2013.01); *H01M 8/0273* (2013.01);
(Continued)

(58) Field of Classification Search
None
See application file for complete search history.

(56) References Cited

U.S. PATENT DOCUMENTS

| 7,851,100 B2 | 12/2010 | Kobayashi et al. |
| 7,935,453 B2 | 5/2011 | Beutel et al. |

(Continued)

FOREIGN PATENT DOCUMENTS

| CN | 1977412 A | 6/2007 |
| CN | 102299342 A | 12/2011 |

(Continued)

OTHER PUBLICATIONS

Machine translation of JP 2007-066766 A (Numao).*
Chinese Office Action for Chinese Application No. 2013800560929 dated Aug. 4, 2016 with English translation.

*Primary Examiner* — Barbara L Gilliam
*Assistant Examiner* — Helen M McDermott
(74) *Attorney, Agent, or Firm* — Muncy, Geissler, Olds & Lowe, P.C.

(57) ABSTRACT

A membrane electrode assembly for a fuel cell that includes a membrane electrode unit with a membrane and two electrodes which make surface contact with both faces of the membrane. The membrane electrode assembly has a seal support that surrounds the periphery of the membrane and that overlaps the latter. The membrane electrode also has a connecting layer which continuously overlaps the membrane and the seal support, an inner edge section of the connecting layer being bonded to the membrane electrode unit and an outer edge section of the connecting layer being bonded to the seal support on the same flat face of the connecting layer. A seal is connected outside the membrane to the seal support. A fuel cell is provided that includes a plurality of membrane electrode assemblies. A motor vehicle includes the fuel cell and a method is provided for producing the membrane electrode assembly.

13 Claims, 9 Drawing Sheets

(51) Int. Cl.
- *H01M 8/1007* (2016.01)
- *H01M 8/1018* (2016.01)
- *H01M 8/0286* (2016.01)
- *H01M 8/0297* (2016.01)
- *H01M 8/0284* (2016.01)
- *H01M 8/0202* (2016.01)

(52) U.S. Cl.
CPC ....... *H01M 8/0284* (2013.01); *H01M 8/0297* (2013.01); *H01M 8/1007* (2016.02); *H01M 8/0286* (2013.01); *H01M 2008/1095* (2013.01); *H01M 2250/20* (2013.01); *H01M 2300/0082* (2013.01); *Y02E 60/50* (2013.01)

(56) References Cited

U.S. PATENT DOCUMENTS

| | | |
|---|---|---|
| 8,309,268 B2 | 11/2012 | Buche et al. |
| 8,399,150 B2 | 3/2013 | Miller et al. |
| 2007/0196718 A1* | 8/2007 | Leistra ................ H01M 8/0276 429/483 |
| 2007/0254199 A1 | 11/2007 | Shu et al. |
| 2007/0264557 A1 | 11/2007 | Kobayashi et al. |
| 2008/0145712 A1* | 6/2008 | Pierpont ............... B32B 37/203 429/509 |
| 2008/0305384 A1* | 12/2008 | Kawashima ........ H01M 8/0273 429/433 |
| 2011/0318667 A1 | 12/2011 | Miller et al. |

FOREIGN PATENT DOCUMENTS

| | | |
|---|---|---|
| DE | 10 2007 019 571 A1 | 11/2007 |
| DE | 10 2009 003 947 A1 | 8/2009 |
| DE | 10 2010 049 548 A1 | 4/2012 |
| DE | 10 2011 105 072 B3 | 11/2012 |
| JP | 2007066766 A * | 3/2007 |
| JP | JP 2007-066766 A | 3/2007 |
| WO | WO 2006/040994 A1 | 4/2006 |
| WO | WO 2010/114139 A1 | 10/2010 |
| WO | WO 2010/114140 A1 | 10/2010 |

* cited by examiner

MEMBRANE ELECTRODE ASSEMBLY, FUEL CELL COMPRISING ASSEMBLY OF THIS TYPE AND MOTOR VEHICLE COMPRISING SAID FUEL CELL

This nonprovisional application is a continuation of International Application No. PCT/EP2013/071862, which was filed on Oct. 18, 2013, and which claims priority to German Patent Application No. 10 2012 020 975.4, which was filed in Germany on Oct. 25, 2012, and which are both herein incorporated by reference.

BACKGROUND OF THE INVENTION

Field of the Invention

The present invention relates to a membrane electrode arrangement for a fuel cell, having a membrane electrode assembly and a seal. The invention also relates to a fuel cell having a plurality of membrane electrode arrangements and a motor vehicle which includes a fuel cell of this type.

Description of the Background Art

Fuel cells use the chemical conversion of a fuel to water with the aid of oxygen to generate electrical energy. For this purpose, fuel cells contain the so-called membrane electrode assembly (MEA for membrane electrode arrangement) as a core component, which is an assembly of an ion-conducting membrane and an electrode disposed on each side of the membrane (anode and cathode). Gas diffusion layers (GDL) may also be disposed on both sides of the membrane electrode assembly, on the sides of the electrode facing away from the membrane. As a rule, the fuel cell is formed by a large number of stacked MEAs, whose electrical outputs add up. During the operation of the fuel cell, the fuel, in particular hydrogen $H_2$, or a hydrogen-containing gas mixture, is supplied to the anode, where an electrochemical oxidation of $H_2$ to $H^+$ takes place by emitting electrons. A (hydrous or anhydrous) transfer of the protons H+ from the anode compartment to the cathode compartment takes place with the aid of the electrolyte or the membrane, which separates the reaction chambers gas-tight from each other and electrically insulates them. The electrons provided to the anode are supplied to the cathode over an electrical line. Oxygen, or an oxygen-containing gas mixture, is supplied to the cathode so that a reduction from $O_2$ to $O^{2-}$ takes place by absorbing the electrons. At the same time these oxygen anions react with the protons transported through the membrane in the cathode compartment, forming water. By directly converting chemical energy into electrical energy, fuel cells achieve an improved efficiency compared to other electricity generators by circumventing the Carnot factor.

The currently most advanced fuel cell technology is based on polymer electrolyte membranes (PEM), in which the membrane itself comprises a polymer electrolyte. Acid-modified polymers, in particular perfluorinated polymers, are used. The most common representative of this class of polymer electrolytes is a membrane made of a sulfonated polytetrafluoroethylene copolymer (trade name: NAFION; copolymer of tetrafluoroethylene and a sulfonyl fluoride derivative of a perfluoroalkyl vinyl ether). The electrolytic conduction takes place with the aid of hydrated protons, which is why proton conductivity is conditional on the presence of water, and a humidifying of the operating gases is necessary during the operation of the PEM fuel cell. Due to the need for water, the maximum operating temperature of these fuel cells under standard pressure is limited to less than 100° C. To distinguish between these fuel cells and high-temperature polymer electrolyte membrane fuel cells (HT-PEM fuel cells), whose electrolytic conductivity is based on an electrolyte which is bound by electrostatic complex binding to a polymer structure of the polymer electrolyte membrane (for example, phosphoric acid-doped polybenzimidazole (PBI) membranes) and which are operated at temperatures of 160° C., this type of fuel cell is also referred to as a low-temperature polymer electrolyte membrane fuel cell (LT-PEM fuel cell).

As mentioned at the outset, the fuel cell is formed by a large number of individual cells arranged in a stack, which are referred to as a fuel cell stack. As a rule, so-called bipolar plates are disposed between the membrane electrode assemblies, which ensure that the individual cells are supplied with the operating media, i.e., the reactants and usually also a cooling fluid. The bipolar plates also ensure an electrically conductive contact between the membrane electrode assemblies.

Seals, which seal the anode and cathode compartments to the outside and prevent the operating media from exiting the fuel cell stack, are disposed between the membrane electrode assemblies and the bipolar plates. The seals may be provided by the membrane electrode assemblies and/or the bipolar plates and, in particular, be connected to these components.

For this purpose, the seals may be vulcanized onto one or both sides of the bipolar plate. The seal may furthermore be deposited onto the bipolar plate in the form of a sealing bead with the aid of a robot. The seal deposited by the robot may have substantial tolerances, which may result in leaks. Up to now, this problem has been counteracted, e.g., by optimizing the process of depositing the sealing bead with the robot.

The membrane may be also laminated between two films (edge reinforcing films) coated with an adhesive. Seals may then be overmolded onto the membrane electrode assemblies, or they may be insert-molded around the membrane electrode assemblies. However, the maximum temperature is determined by the membrane electrode assembly and is approximately 120° C. This temperature limitation plays a role in the process times for cross-linking the elastomer of the seal and results in high costs due to long process times as well as a large number of rejects. The reject costs resulting therefrom are attributable to faulty insert-molding of the membrane electrode assembly as well as the handling of this extremely sensitive component in a stamping and injection molding process.

DE 10 2009 003 947 A1, which corresponds to U.S. Pat. No. 7,935,453, discloses a UEA (unitized electrode assembly), comprising an MEA, which includes an electrolyte membrane which does not extend substantially beyond an active region of the MEA. A barrier film is disposed between a seal of the UEA, which surrounds a chemically active region, and the chemically active region. The barrier film may overlap the MEA outside the active region. In addition, the barrier film may act as a support for the seal and be designed, in particular, to form a single piece therewith. The MEA may be coupled with the barrier film with the aid of a chemical adhesive. Depending on the connection configuration, a connecting film may also cover one end of the electrolyte membrane.

WO 2010/114139, which corresponds to US 20110305976, describes a manufacturing method for a fuel cell and for fuel cell modules of the fuel cell. The fuel cell comprises electrode units, each of which includes an MEA and a porous layer on the anode side and on the cathode side of the MEA. The MEA furthermore includes an electrolyte membrane and a catalytic anode and cathode layer. The porous layer includes a gas diffusion layer (made of carbon paper) facing the MEA and a gas flow field layer (made of sintered metal foam). Separators (corresponding to bipolar plates), each of which includes three steel plates, are disposed between the electrode units. Frame-shaped seals, which surround the electrode units, are disposed between and make contact with the separators.

A first unit including a separator and an outer frame of the frame-shaped seal and a second unit including the electrode unit and an inner frame of the frame-shaped seal are first formed during manufacturing. The inner frame, along with the electrode unit, is then inserted into the outer seal. As another variant, the electrode unit may also be inserted directly into a unit including the separator and the frame-shaped seal.

WO 2010/114140 A1, which corresponds to US 20120009506, discloses a manufacturing method for a cell arrangement of a fuel cell. The structure of the fuel cell is essentially similar to the structure of WO 2010/114139. The electrode unit, the separator and a seal preform, which has the shape of a frame, are first produced during manufacturing. The electrode unit, the separator and the seal preform are disposed in a forming die, which includes a pressing device. The individual parts are connected to each other in the forming die by pressure and heat.

SUMMARY OF THE INVENTION

It is therefore an object of the present invention to provide a membrane electrode arrangement, which is easier to manufacture.

The membrane electrode arrangement according to an exemplary embodiment of the invention for a fuel cell comprises a membrane electrode assembly, which includes a membrane and two electrodes which make surface contact with both sides of the membrane. The membrane electrode arrangement also comprises a seal support which circumferentially surrounds and overlaps the membrane. The membrane electrode arrangement furthermore comprises a connecting layer, which circumferentially overlaps the membrane and the seal support, an inner edge section of the connecting layer being integrally connected to the membrane electrode assembly, and an outer edge section of the connecting layer being integrally connected to the seal support, on the same flat side of the connecting layer. The membrane electrode arrangement also comprises a seal, which is connected to the seal support outside the membrane.

The membrane can be a proton-conducting membrane (polymer electrolyte membrane). The electrodes form an anode and a cathode and may be coated on both sides of the membrane.

The inner edge section of the connecting layer can be integrally connected to the membrane and/or an electrode of the membrane electrode assembly.

In flat elements, the sides (surfaces) whose extensions are significantly larger compared to other sides of the elements are referred to as "flat" sides.

Due to the integral connection, the connecting layer can establish sealing surfaces to the seal support and to the membrane electrode assembly which surround a chemically active region of the membrane electrode assembly. As a result, an undesirable transfer of operating media between the two sides of the membrane is prevented. A sufficient stability of the membrane electrode arrangement is furthermore ensured by the integral connection. The chemically active region is the region of the membrane electrode assembly to which reactant is applied during operation. The connecting layer can be a film, in particular a plastic film.

The seal can be designed to circumferentially surround the membrane. As a result, the chemically active region of the membrane electrode assembly is also circumferentially surrounded by the seal. Due to the fact that the seal surrounds the chemically active region, reactants and reaction products are prevented from exiting a fuel cell which comprises the membrane electrode arrangement. The electrodes of the membrane electrode assembly thus are also disposed within the chemically active region which is circumferentially surrounded by the seal.

The seal can be integrally connected to the seal support. This may be implemented by overmolding the seal onto the seal support, for example by partially melting the affected materials.

The seal is usually connected to the seal support outside the connecting layer.

The seal furthermore usually extends on both sides along the seal support, in particular in two subsections. The two subsections extend on both sides of the seal support, in that the first subsection extends along a first flat side of the seal support and the second subsection extends along a second flat side of the seal support.

The two subsections have sealing surfaces, the sealing surfaces of the first subsection and the second subsection preferably essentially forming congruent, orthographic projection regions on the seal support. Sealing surfaces can refer to, for example, those surfaces which are designed to abut and seal a counter-surface, e.g., a bipolar plate. The sealing surfaces are particularly preferably designed to be mirror-symmetrical with respect to the seal support (or a plane situated therein).

The seal can have two sealing lips per subsection, which are formed by a corresponding profiling of the seal. Two independent sealing lines are formed thereby, i.e., two sealing regions which act as double protection against leaks. The two sealing lips can run all around a sealed region.

The seal support can be a seal support film made of a plastic. In particular, the seal support film can be a PEN film (polyethylene naphthalate), or the seal support film includes PEN.

The seal support can have at least one opening for the passage of operating media, which can circumferentially surrounded by the seal. Openings for the passage of operating media are used to supply the membrane electrode assembly with operating media. As a result, the fuel cell stack may be supplied with the operating media in a compact and space-saving manner. The operating media include reactants, i.e., fuel (e.g., hydrogen) and oxidizing agents (e.g., oxygen or air) as well as cooling media, in particular cooling fluid. Reaction products (e.g., water) may furthermore be discharged through openings.

The membrane electrode arrangement may comprise gas diffusion layers (GDL), which are disposed within the chemically active region surrounded by the seal. The electrodes may be connected by the gas diffusion layers to so-called gas diffusion electrodes.

The connecting layer can be disposed on a flat side of the membrane opposite the seal support. As a result, the membrane (for example the entire membrane electrode assembly) is situated in a protected manner between the connecting layer and the film support.

The integral connection can be an adhesive bond. Adhesive bonds are easy and economical to manufacture. The adhesive bond may be both a pressure-sensitive adhesive bond (e.g., with the aid of an adhesive cement) as well as thermally activatable adhesive bond and/or an adhesive bond which includes a hot glue.

According to an embodiment of the invention, the connecting layer can be coated with an adhesive, in particular the connecting layer itself can be a self-adhesive film. Due to this embodiment, a connection of the membrane electrode assembly, and thus a connection of the membrane, to the seal support, may be particularly easily established. The connecting layer, in particular the self-adhesive film, is thus easily integrally connected to the membrane electrode assembly and the seal support, which overlap each other.

An inner edge of the connecting layer can ends with an offset against an inner edge of the seal support. In particular, the inner edge of the connecting layer projects beyond the inner edge of the seal support (in the direction of the chemically active region, i.e., in the direction of the middle of the membrane). Due to this embodiment, a uniform thickness of the membrane electrode arrangement is achieved, and a shearing action upon the membrane between the seal support and the connecting layer is prevented or at least reduced.

The seal support can have a perforation, along which the seal extends on both sides of the seal support. A first subsection of the seal is disposed on a first flat side and a second subsection is disposed on a second flat side of the seal support. The two subsections are connected to each other as a single piece through the perforation. The seal is thereby connected to the seal support in a form-locked manner. A large number of form-locked connecting points can be provided by the perforation and the seal passing through the perforation. Orthographic projections of the two subsections onto the seal support preferably include a congruent region, the seal support having the perforation within the congruent region. The perforation includes recesses which pass through the seal support and have an arbitrary shape, e.g., a circular shape, an arbitrary arrangement, i.e., spaced a regular or irregular distance apart, and are of an arbitrary number, however having at least one recess.

A fuel cell is also provided. The fuel cell can include a plurality of alternately stacked bipolar plates and membrane electrode arrangements according to the invention. The seal, in particular its subsections, can seals spaces between the membrane electrode assemblies and the bipolar plates.

A motor vehicle comprising the fuel cell according to the invention is furthermore provided. The fuel cell is preferable used to supply the motor vehicle with electrical current. In particular, the fuel cell can be provided to supply power to an electrical drive of the motor vehicle.

A method for manufacturing a membrane electrode arrangement according to the invention is also provided. The method comprises a step for manufacturing the seal in the region of the seal support and a subsequent step for integrally connecting the inner edge section of the connecting layer to the membrane electrode assembly and integrally connecting the outer edge section of the connecting layer to the seal support.

The inner edge section of the connecting layer can be integrally connected to the membrane and/or the electrodes of the membrane electrode assembly.

A joining of the seal support and the membrane, i.e., a joining of the seal support and the entire membrane electrode assembly, can be performed prior to the integral connection.

The manufacture of the seal can be implemented by overmolding the seal onto the seal support. This takes place by overmolding a (source) material of the seal. A step for cross-linking the (source) material can takes place. Due to this embodiment, a tight connection between the seal and the seal support can be established.

In contrast to insert-molding a membrane electrode assembly (MEA), the seal can be molded only onto the seal support without the membrane electrode assembly, according to an embodiment of the invention, or the seal can be insert-molded with the seal support. A maximum implementable processing temperature thus depends on the seal support, in particular on a film used for this purpose, and not on the membrane electrode assembly. The cost of rejects is reduced to the cost of the seal support and the seal. In the next step, the relatively sensitive membrane, or the entire membrane electrode assembly, is positioned in an opening region (window) of the seal support, which later essentially represents the chemically active region (i.e., a chemically active surface). The adhesive bonding of the membrane electrode assembly usually takes place by applying the connecting layer (for example a frame), which is coated with an adhesive (adhesive cement). The gas diffusion layers may be either laminated (i.e., connected to the membrane using an adhesive-free hot pressing method) or integrally connected according to known methods.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
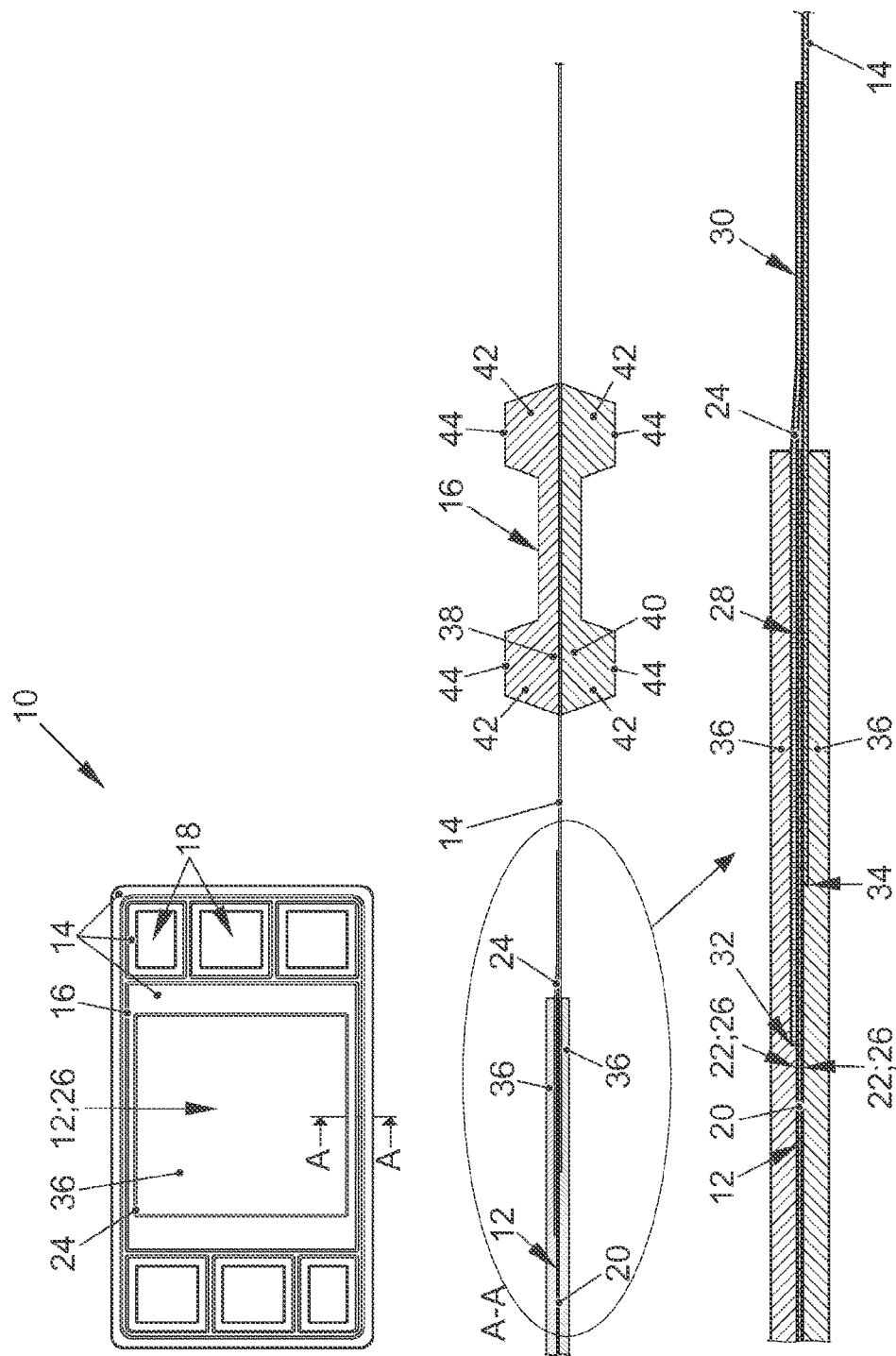
FIG. 1 shows a membrane electrode arrangement according to the invention according to one preferred embodiment of the invention.

According to an exemplary embodiment of the invention, a membrane electrode arrangement 10 is illustrated in FIG. 1 in a top view, a sectional view (A-A) and a detailed view of the sectional view (A-A).

Membrane electrode arrangement 10 comprises a membrane electrode assembly 12 (MEA), a seal support 14 and a seal 16, which is connected to seal support 14. Seal support 14 may have openings 18 for the passage of operating media.

Membrane electrode assembly 12 (MEA) includes a membrane 20 and electrodes 22 disposed on both sides of membrane 20. (The electrodes themselves are not illustrated, only their positions are marked.) Membrane electrode arrangement 10 provides a chemically active region 26, to which reactants are applied during operation and in which the desired reactions take place. Both flat sides of membrane 20 are usually completely covered by electrodes 22. However, electrodes 22 may furthermore also be limited to the chemically active region and thus only partially cover the flat sides of membrane 20.

As is apparent in sectional view A-A and the corresponding detailed view, membrane 20 is fitted into an opening region of seal support 14. Membrane 20 and, in the example, entire membrane electrode assembly 12 circumferentially overlap seal support 14, and it is connected to seal support 14 by a connecting layer 24. This is accomplished in that connecting layer 24 is integrally connected to membrane electrode assembly 12, i.e., to its membrane 20 and/or electrodes 22, and is also integrally connected to seal support 14. For this purpose connecting layer 24 circumferentially overlaps both membrane 20 and seal support 14. To implement the integral connection, connecting layer 24 may be designed as a self-adhesive film. As a rule, the latter is coated with an adhesive, which (on the same flat side of connecting layer 24) makes contact with membrane electrode assembly 12 in an inner edge section 28 and with seal support in an outer edge section 30. Since both seal support 14 and connecting layer 24 have a closed circumferential shape, they surround membrane 20 and, in particular, chemically active region 26. Due to the likewise closed, circumferential integral connection between connecting layer 24 and membrane electrode assembly 12, as well as between connecting layer 24 and seal support 14, circumferentially closed sealing regions are created, which prevent reactants from passing from one side of membrane 20 to the other side of membrane 20 during operation.

As is apparent, membrane electrode assembly 12 may be disposed between seal support 14 and connecting layer 24, so that membrane 20 is stabilized in its edge regions between seal support 14 and connecting layer 24. In other words, connecting layer 24 may be disposed on a flat side of membrane 20 opposite seal support 14.

In addition, an inner edge 32 of connecting layer 24 may end with an offset against an inner edge 34 of seal support 14, whereby the mechanical load on relatively sensitive membrane electrode assembly 12 is reduced. In the illustrated case, inner edge 32 of connecting layer 24 projects beyond inner edge 34 of seal support 14.

Gas diffusion layers 36 may abut membrane electrode assembly 12 on both sides.

Seal 16 may have a first subsection 38 and a second subsection 40, which extend on both sides of seal support 14. The two subsections 38, 40 may each form two sealing lips 42. The subsections can have sealing surfaces 44 for sealing a bipolar plate. To reduce a mechanical load on seal support 14, sealing surfaces 44 may be provided with a mirror-symmetrical design with respect to seal support 14.

Figure 2:
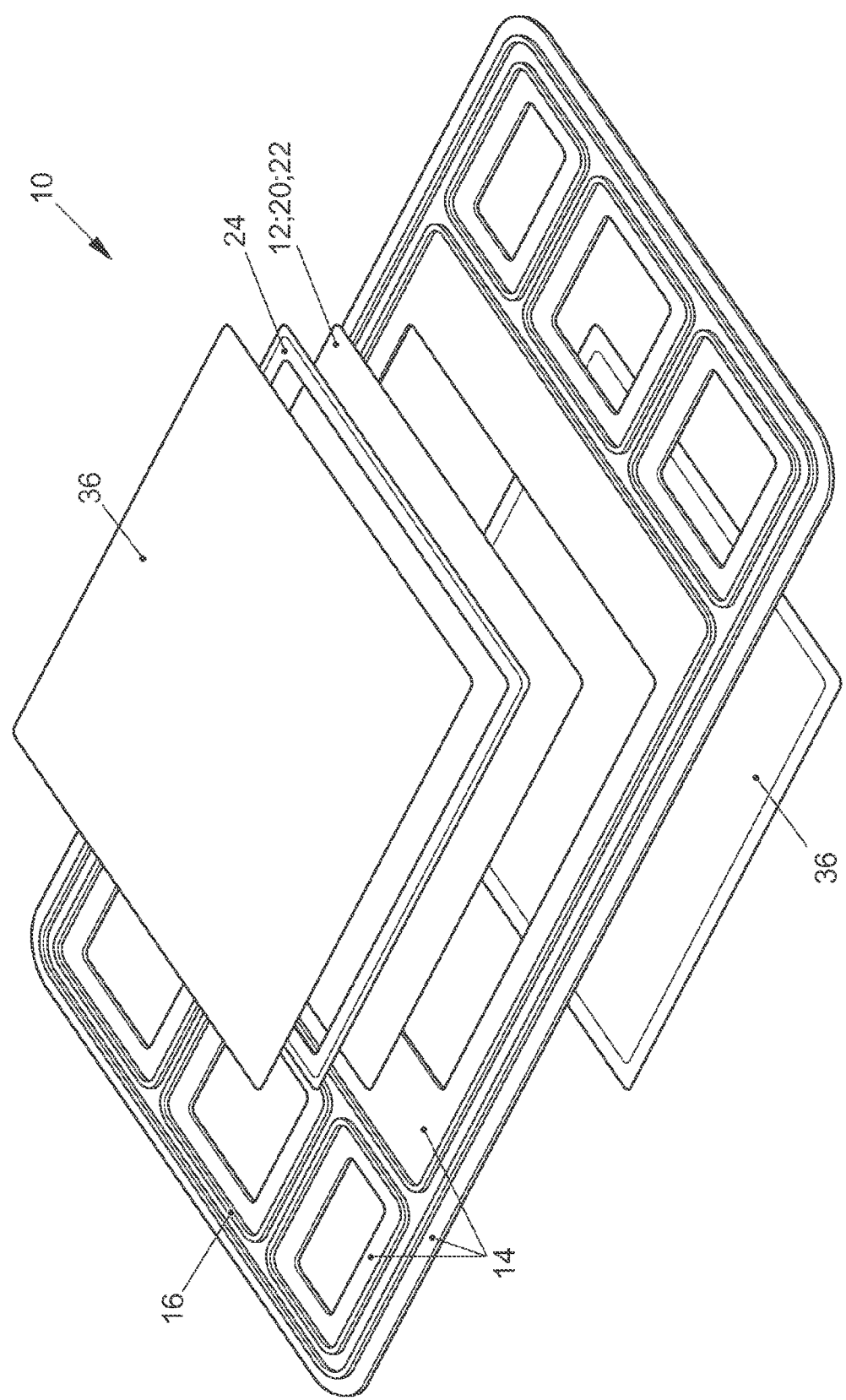
FIG. 2 shows an exploded view of the membrane electrode arrangement.

FIG. 2 shows an exploded view of membrane electrode arrangement 10, which is already known from FIG. 1 and which was already discussed above. The following FIGS. 3 through 7 shows the individual steps according to one preferred sequence for manufacturing membrane electrode arrangement 10.

Figure 3:
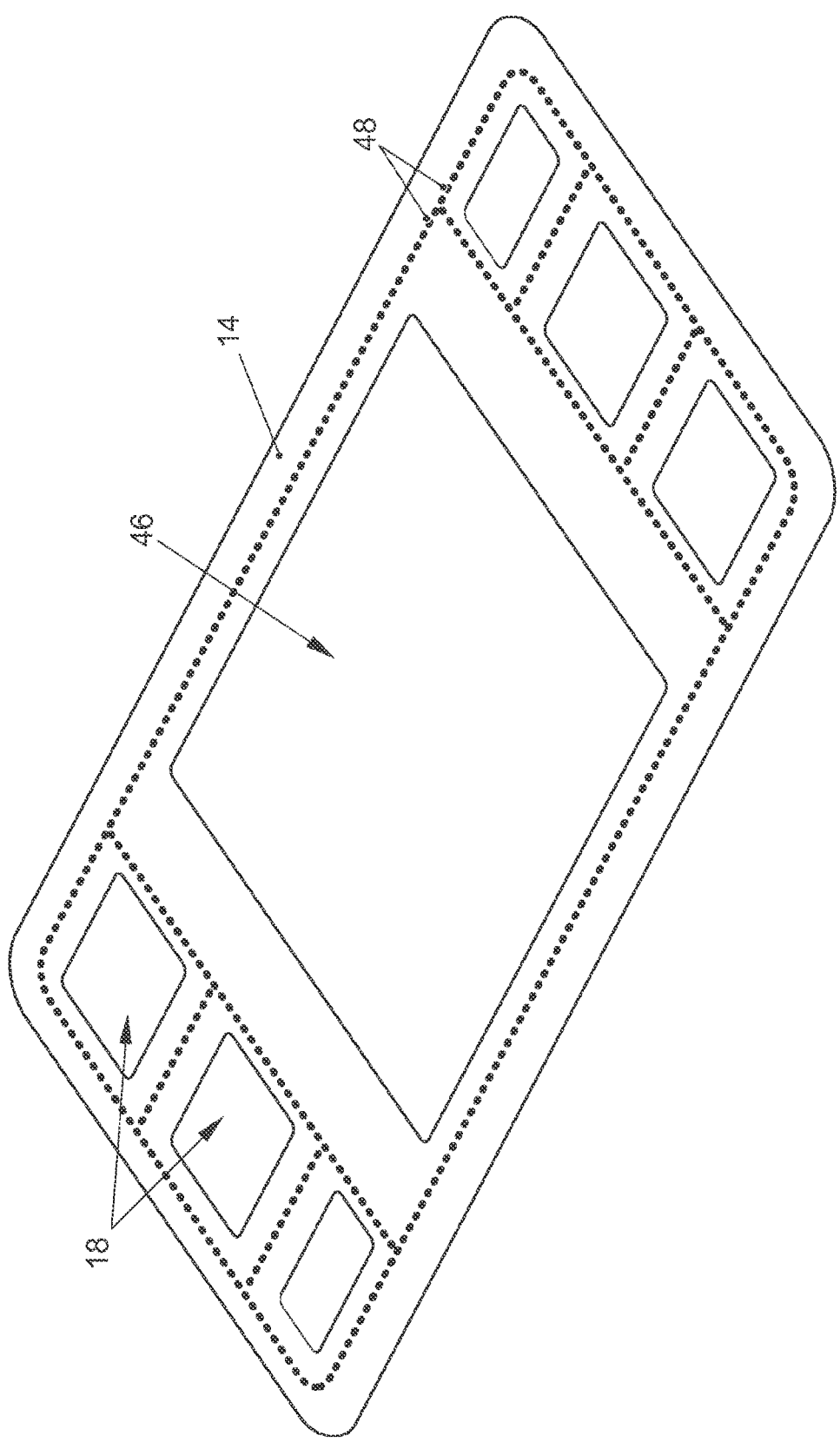
FIG. 3 shows the seal support.

The manufacturing method can begins with seal support 14 shown in FIG. 3 (edge reinforcement or film support). It may have operating medium openings 18 and an opening region 46. In addition, seal support 14 may have a perforation 48, along which seal 16 is mounted onto seal support 14 in the next manufacturing step. Operating medium openings 18 as well as opening region 48 and recesses of perforation 48 are recesses which pass through seal support 14. These through-recesses 18, 46, 48 and the contour of seal support 14 may usually be produced by stamping seal support 14 out of a film (for example a plastic film) of the seal support.

One option for mounting seal 16 onto seal support 14 is to overmold seal 16 onto seal support 14. This takes place within an injection molding die, by injecting a reaction mixture, comprising a polymer to be cross-linked or monomers and possibly a cross-linking agent into the injection molding die. Thanks to perforation 48, a pressure compensation may take place within the reaction mixture of the two subsections 38, 40 during the overmolding process. A deformation of seal support 14, due to possible, different pressures on both sides of seal support 14, may be prevented thereby. After overmolding, a cross-linking and/or polymerization process usually occur(s), which take(s) place by heating the reaction mixture over a predefined period, Thanks to perforation 48, the two subsections 38, 40 are connected to each other as a single piece through perforation 48, whereby seal 16 is connected to seal support 14 in a form-locked manner.

Figure 4:
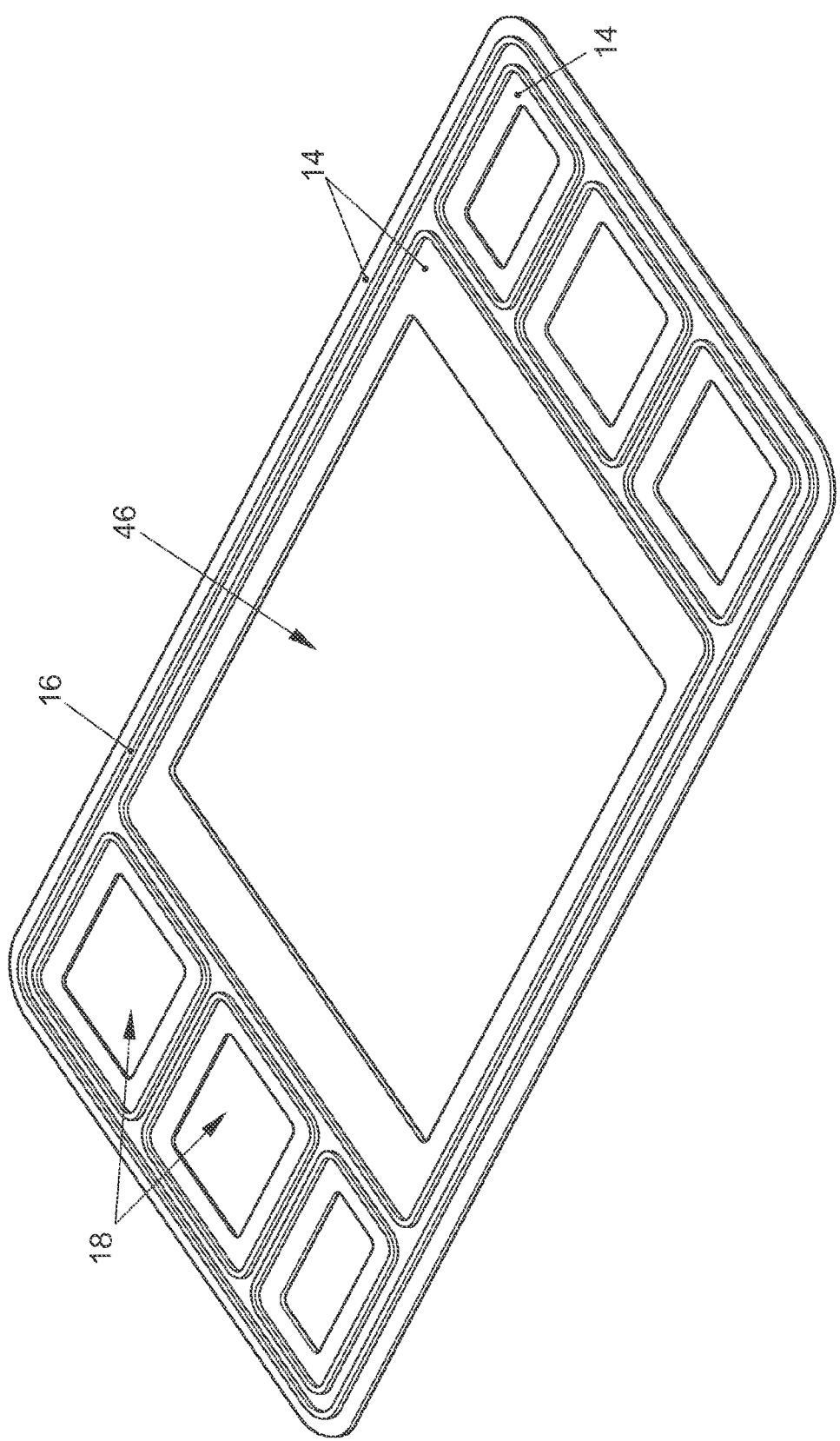
FIG. 4 shows the seal support with the seal.

Seal 16, which is already connected to seal support 14, i.e., can be overmolded thereon, is apparent in FIG. 4. This unit may also be referred to as a film sealing frame.

Figure 5:
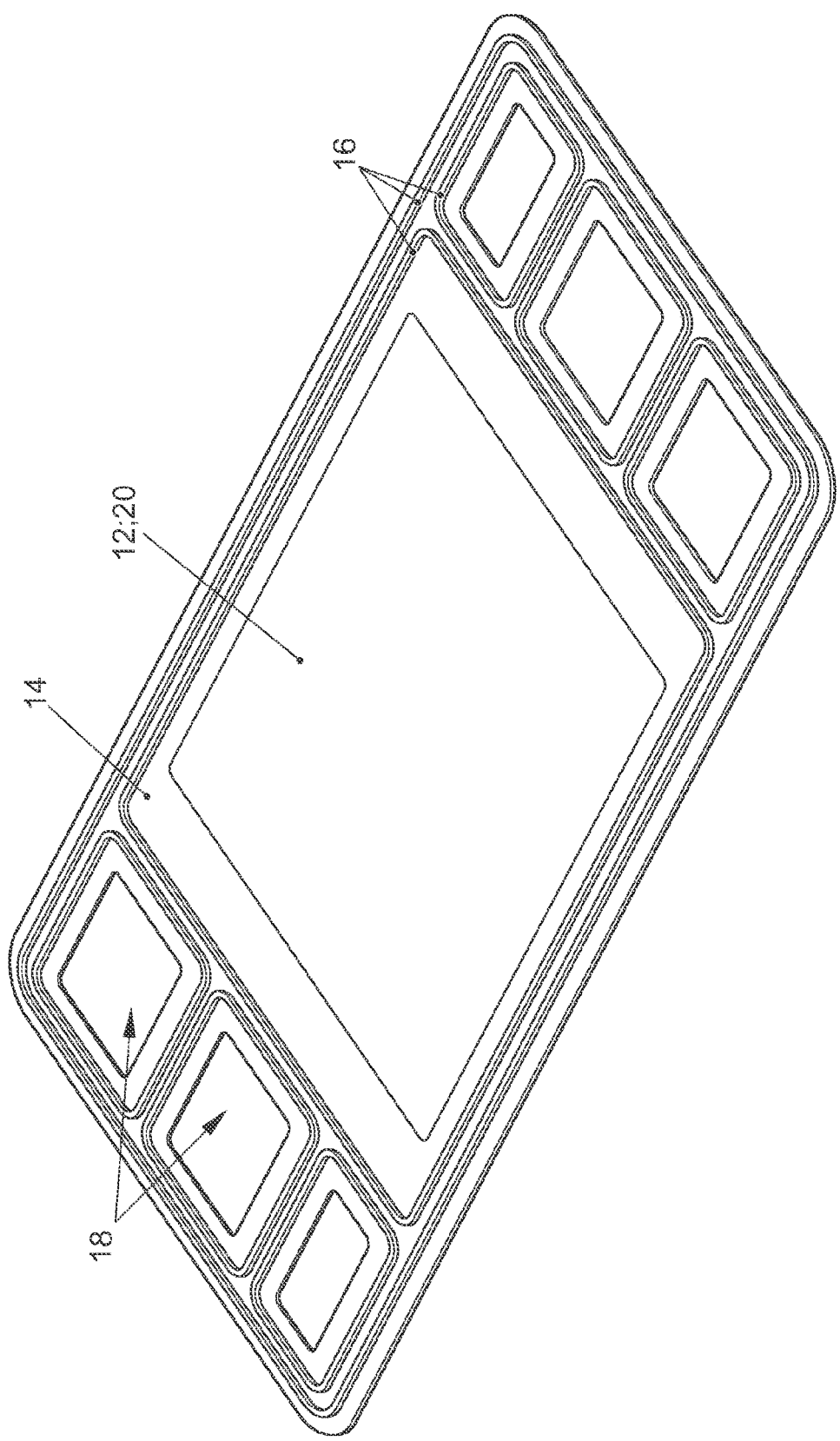
FIG. 5 shows the seal support with the seal and the membrane.

A joining of seal support 14 and membrane electrode assembly 12 can takes place as the next step—see FIG. 5. For this purpose, membrane electrode assembly 12 is positioned above seal support 14 in the illustrated example, opening region 46, which is still visible in FIG. 4, being closed by membrane electrode assembly 12. Membrane 20 overlaps seal support 14 in its edge regions.

Figure 6:
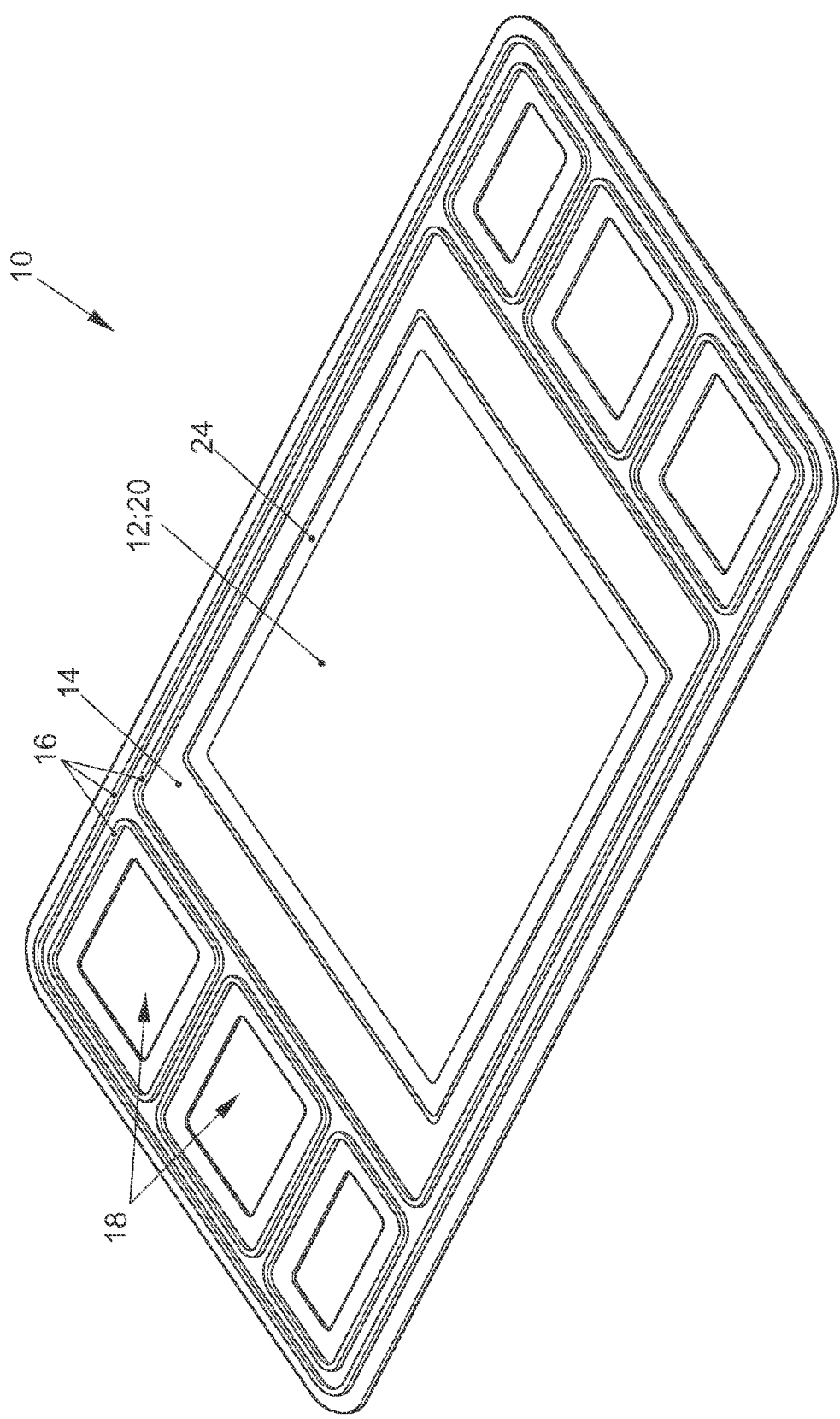
FIG. 6 shows the seal support with the seal, the membrane and the connecting layer.

FIG. 6 shows membrane electrode arrangement 10 after another manufacturing step. Connecting layer 24 (adhesive frame), e.g., a self-adhesive film, is integrally connected to membrane electrode assembly 12 and seal support 14, overlapping therewith, in the illustrated frame mold.

Alternatively, seal support 14 may also be integrally connected directly to membrane electrode assembly 12 in the edge region overlapping membrane 20 by applying an adhesive (on seal support 14 and/or membrane electrode assembly 12, e.g., its membrane 20). Implementing this variant, however, requires a relatively complex step of applying the adhesive to the particular edge region. A bonding with the aid of connecting layer 24 is therefore preferred.

Figure 7:
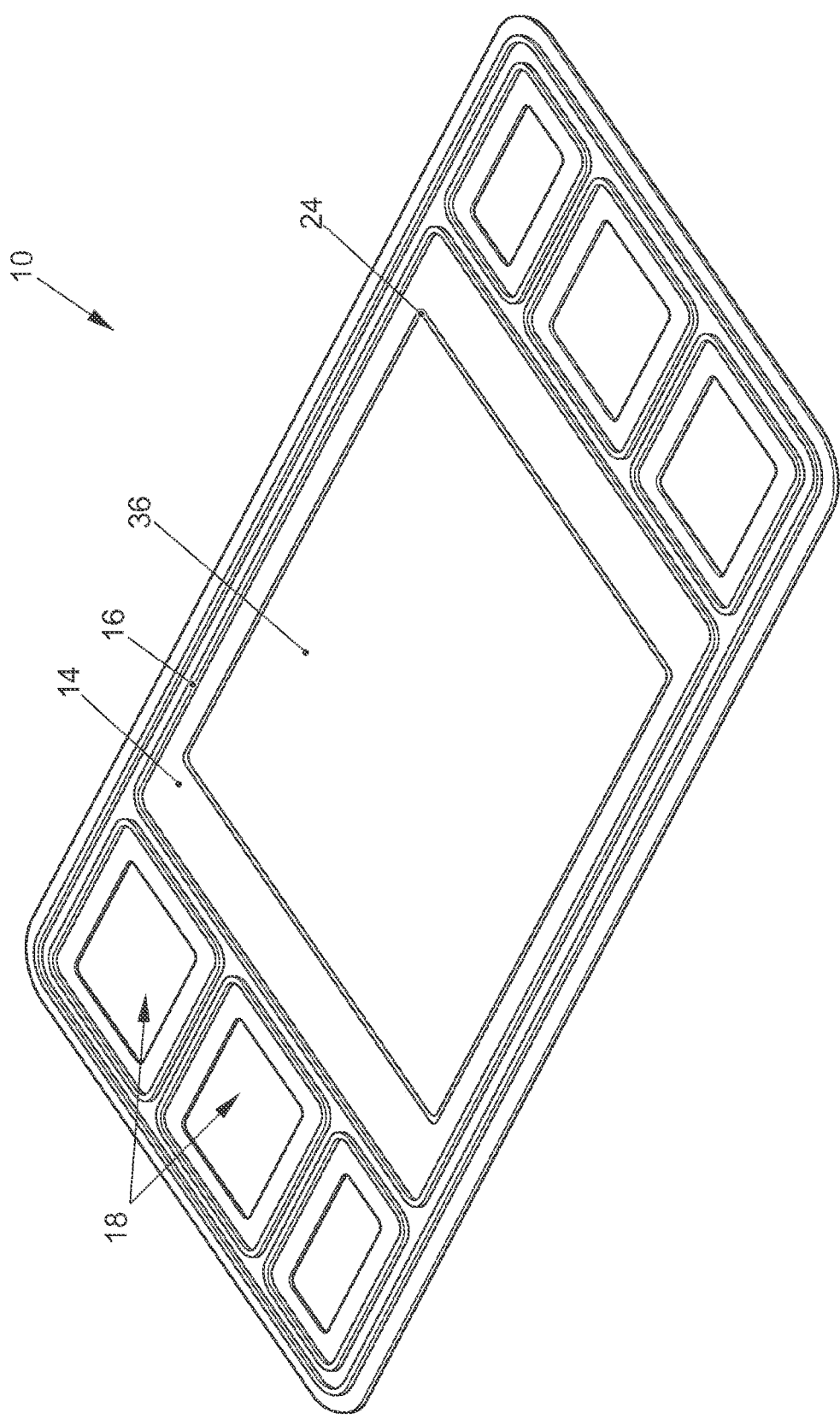
FIG. 7 shows the membrane electrode arrangement with the diffusion layers.

In the final step, gas diffusion layers 36 may still be integrally connected or laminated onto both sides of membrane electrode assembly 12. FIG. 7 shows membrane electrode arrangement 10 after this step.

A fastening of membrane 20 thus takes place on seal support 14 (i.e., on a single layer of edge reinforcement), which is already provided with seal 16, by applying connecting layer 24 (for example an adhesive frame).

Due to the invention, a connection of seal 16 to seal support 14, i.e., an overmolding of seal 16 onto seal support 14 (or even an insert-molding of seal support 14 with seal 16) takes place before seal support 14 is connected to membrane 20. At the same time, this connection of seal support 14 to membrane 20 takes place in a conceivably easy manner with the aid of connecting layer 24. Due to the subsequent mounting of membrane electrode assembly 12, the reject costs are reduced and the process times for overmolding seal 16 are shortened.

Due to the one-sided bonding, a stable membrane electrode arrangement 10 is achieved, which is more cost-effective and more reliable to manufacture.

Figure 8:
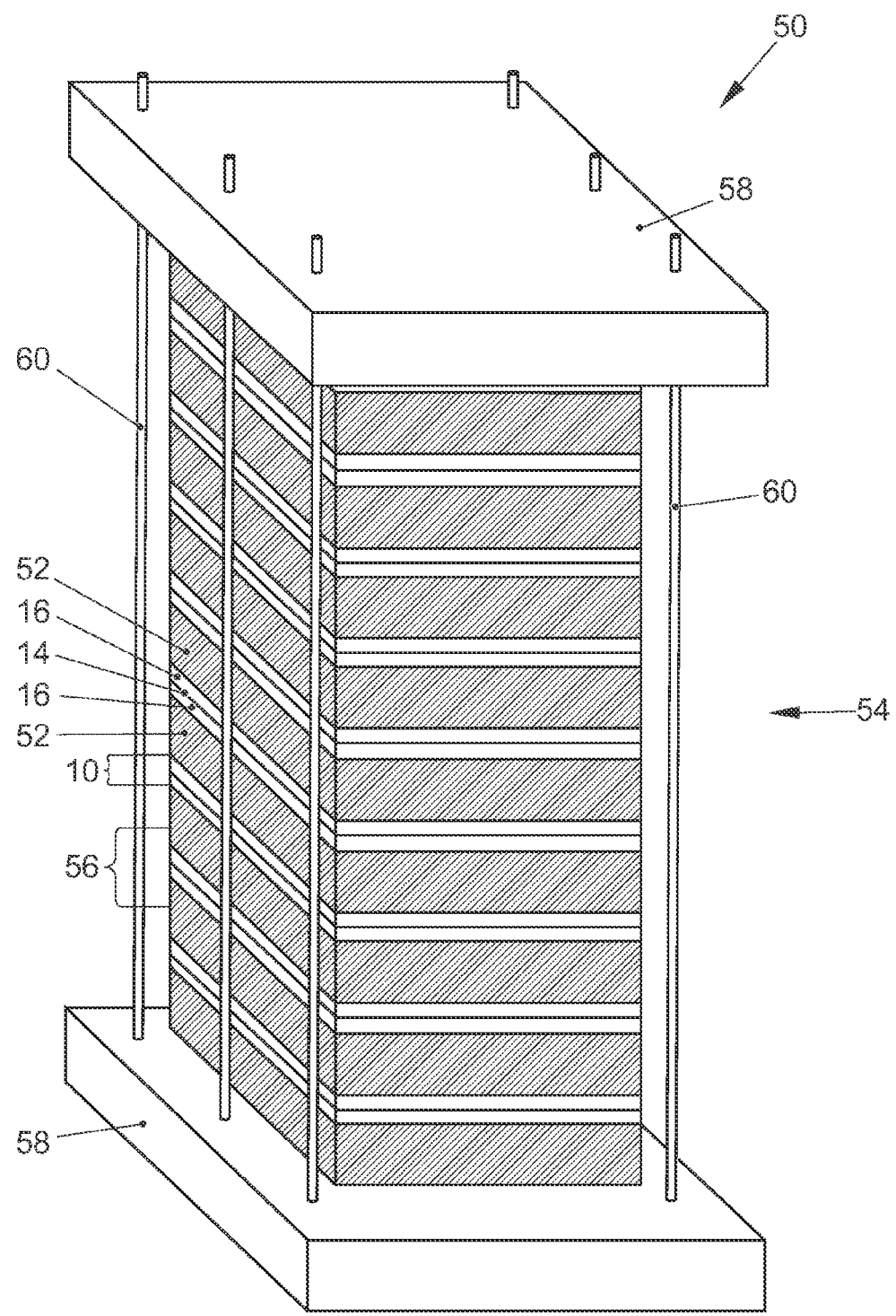
FIG. 8 shows a fuel cell comprising the membrane electrode arrangement.

FIG. 8 shows a schematic representation of a fuel cell 50 comprising multiple membrane electrode arrangements 10 according to the invention. Membrane electrode arrangements 10 are stacked, alternating with bipolar plates 52, to form a fuel cell stack 54 comprising multiple individual cells 56.

Bipolar plates 52 supply membrane electrode assemblies 12 of membrane electrode arrangements 10 with reactants via gas diffusion layers 36, for which purpose suitable channels are usually provided in bipolar plates 52. In addition, bipolar plates 52 electrically conductively connect two adjacent membrane electrode assemblies 12, whereby they are connected in series. The two end bipolar plates are also referred to as monopolar plates, since they supply adjacent membrane electrode assembly 12 only on one side and, for this purpose, have corresponding channels only on one of their sides.

Seals 16 of membrane electrode arrangements (10) seal the spaces between membrane electrode assemblies 12 and bipolar plates 52 to the outside and thus prevent the operating media from exiting fuel cell stack 54 during the operation of fuel cell 50.

To ensure the proper functioning of seals 16 as well as an electrically conductive contact of bipolar plates 52 to membrane electrode assemblies 12, even during vibrations (e.g., due to a use in a motor vehicle), fuel cell stack 54 can be pressed. This is usually done with the aid of two end plates 58, which are disposed on both ends of fuel cell stack 54, in combination with multiple tension elements 60. Tension elements 60 conduct tensile forces into end plates 58, so that end plates 58 press fuel cell stack 54 together.

Figure 9:
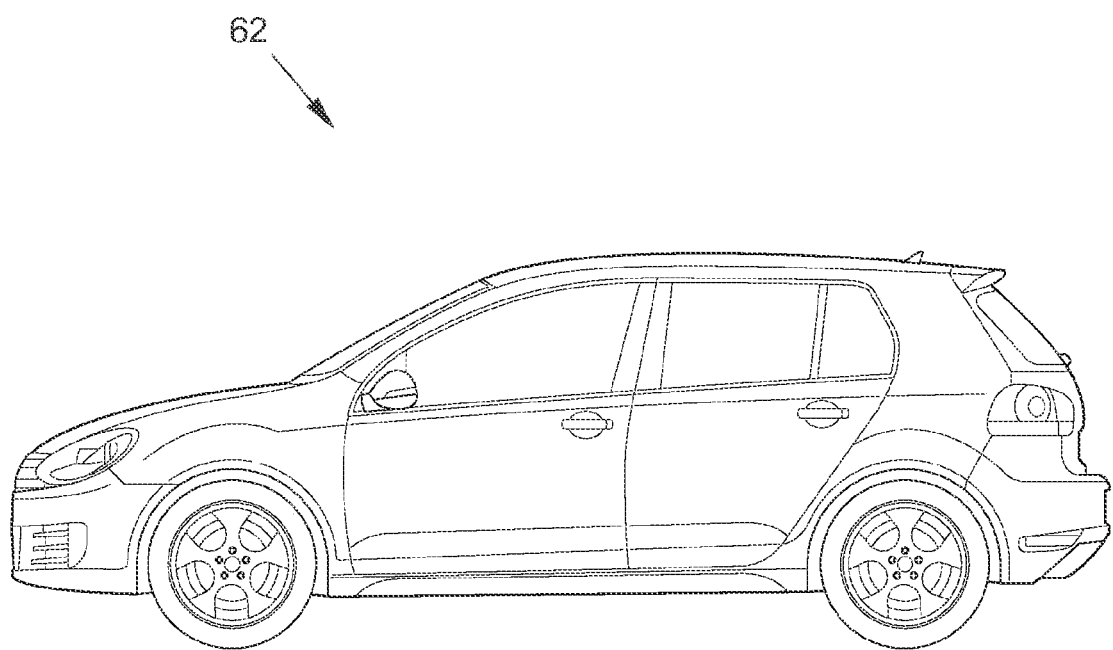
FIG. 9 shows a motor vehicle comprising the fuel cell.

FIG. 9 shows a motor vehicle 62 comprising fuel cell 50. Fuel cell 50 provides electrical energy during operation of motor vehicle 62, for example, for an electrical drive system of motor vehicle 62.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A membrane electrode arrangement for a fuel cell, comprising:
   a membrane electrode assembly that includes a membrane and two electrodes that make surface contact with both sides of the membrane;
   a seal support that circumferentially surrounds and overlaps the membrane, such that, in a fully assembled state of the membrane electrode arrangement, a first planar surface of the seal support, that extends continuously along a single plane, non-integrally contacts the membrane in an overlapping region of the seal support and the membrane;
   a connecting layer that circumferentially overlaps the membrane and the seal support, one side of the connecting layer being coated with an adhesive such that an inner edge section of the one side of the connecting layer is integrally connected to the membrane electrode assembly and an outer edge section of the one side of the connecting layer is integrally connected to the first planar surface of the seal support by an adhesive bond; and
   a seal that is connected to the seal support outside the membrane and outside the connecting layer,
   wherein a portion of the seal directly contacts the first planar surface of the seal support and a second portion of the seal directly contacts a second planar surface of the seal support, the second planar surface opposing the first planar surface.

2. The membrane electrode arrangement according to claim 1, wherein the connecting layer is disposed on a flat side of the membrane opposite the seal support.

3. The membrane electrode arrangement according to claim 1, wherein the connecting layer is a self-adhesive film.

4. The membrane electrode arrangement according to claim 1, wherein an inner edge of the connecting layer ends in an offset against an inner edge of the seal support or projects beyond it.

5. The membrane electrode arrangement according to claim 1, wherein the seal support has a perforation along which the seal extends on both sides of the seal support, wherein the seal includes a first subsection and a second subsection, wherein the first subsection of the seal is the portion of the seal that directly contacts the first planar surface of the seal support and the second subsection of the seal is the second portion of the seal that directly contacts the second planar surface of the seal support, and wherein the first and second subsections are connected to each other as a single piece via the perforation.

6. A fuel cell comprising a plurality of alternately stacked bipolar plates and a membrane electrode arrangement according to claim 1.

7. A motor vehicle comprising a fuel cell according to claim 6.

8. The membrane electrode arrangement according to claim 1, further comprising a first gas diffusion layer that overlaps the membrane and the connecting layer on a first side of the membrane and a second gas diffusion layer that overlaps the membrane and the seal support on a second side of the membrane.

9. The membrane electrode arrangement according to claim 1, wherein the seal is connected to the seal support outside the membrane and outside the connecting layer, such that the seal is directly connected solely to the seal support.

10. The membrane electrode arrangement according to claim 1, wherein an inner edge of the connecting layer projects beyond an inner edge of the seal support.

11. The membrane electrode arrangement according to claim 1, wherein the seal support and the connecting layer are each formed as flat, planar members.

12. A method for manufacturing a membrane electrode arrangement according to claim 1, the method comprising:
   manufacturing the seal in a region of the seal support, such that the portion of the seal directly contacts the first planar surface of the seal support and the second portion of the seal directly contacts the second planar surface of the seal support;
   placing the membrane electrode assembly on the seal support such that the first planar surface of the seal support, that extends continuously along a single plane, non-integrally contacts the membrane electrode assembly; and
   subsequently integrally connecting the inner edge section of the connecting layer to the membrane electrode assembly and the outer edge section of the connecting layer to the first planar surface of the seal support, wherein the seal support continues to non-integrally contact the membrane electrode assembly in a fully assembled state of the membrane electrode arrangement.

13. The method according to claim 12, wherein the seal is overmolded onto the seal support.

* * * * *